United States Patent Office 2,865,933
Patented Dec. 23, 1958

2,865,933
PROCESS FOR THE PREPARATION OF ANTHRAQUINONE

Talfryn James and Dominic A. Zanella, Lock Haven, Pa., assignors to Koppers Company, Inc., a corporation of Delaware No Drawing. Application March 28, 1956
Serial No. 574,379

10 Claims. (Cl. 260—385)

This invention relates to the preparation of anthraquinone of high purity by the oxidation of anthracene with concentrated nitric acid and the recovery of the anthraquinone thus produced.

Anthraquinone is a valuable intermediate or starting material for the manufacture of vat dyes and has heretofore been produced by processes which, while successful, have certain recognized disadvantages. It is known to carry out the oxidation of anthracene by means of various oxidizing agents, but the resulting product is invariably contaminated with impurities the removal of which is difficult, costly and frequently impossible so that it has not heretofore been possible to obtain anthraquinone of high purity and yield by the oxidation of anthracene in a simple economical manner. For example, it is known to treat coal tar anthracene of 80-92% purity prepared in a finely-divided state by distillation with superheated steam and then to oxidize the anthracene with sodium dichromate in suspension in dilute sulfuric acid at 80° C. The anthraquinone thus obtained is purified by sulfonation of unchanged hydrocarbon and results in a yield of approximately 91%. Another and more extensively employed procedure is to condense phthalic anhydride with benzene in the presence of aluminum chloride, followed by heating of the keto acid with concentrated sulfuric acid on the steam bath, whereupon cyclization occurs with formation of anthraquinone.

One of the objects of the present invention is to produce anthraquinone of very high purity and in practically quantitative yield by the oxidation of anthracene, preferably dissolved in an inert organic solvent, with concentrated nitric acid or a solution of concentrated nitric acid in an inert organic solvent, the oxidation being carried out at an elevated temperature.

Another object of this invention is to provide a new, valuable and highly economical procedure for preparing anthraquinone by the oxidation of anthracene at a temperature of at least about 150° C., employing concentrated nitric acid as the oxidant and preferably employing nitrobenzene as a solvent.

According to the invention, anthracene is melted or preferably dissolved in an inert solvent, such as nitrobenzene, and the resultant liquid is placed in a suitable reaction vessel and heated, with stirring, to an elevated suitable temperature of at least about 150° C. While maintaining the liquid at such temperature, concentrated nitric acid is gradually added either by itself or dissolved in nitrobenzene or other inert solvent. After the addition of nitric acid is completed the resultant mass is cooled to 20° C., and anthraquinone crystallizes out and is suitably recovered. The anthraquinone thus produced is of exceptionally high purity of the order of at least about 98-99% and in the preferred method of practising this invention the conversion is practically quantitative.

The invention is illustrated by the following examples without limiting the same thereto. Unless otherwise indicated, parts and percentages are given by weight here and throughout the specification:

Example I

Twenty-five (25) parts of anthracene of 95.8% purity was melted in a reaction vessel which was heated by an oil bath containing oil at a temperature of 240° C. When the temperature of the anthracene had reached 220° C., nitric acid (98% concentration) was dropped in very slowly until a total of 35 parts of nitric acid had been added. Then the reaction mass was cooled and 200 parts of nitrobenzene added. The temperature was raised to 175° C. until the product was completely dissolved. This solution was cooled to room temperature and the precipitated anthraquinone was separated by filtration. Nitrobenzene was removed from the filtrate by steam distillation to give a practically pure anthraquinone product having a melting point of 284-286° C. in better than 65 percent of theoretical yield.

Example II

Twenty-five (25) parts of anthracene of 95.8% purity and 200 parts of nitrobenzene are introduced into a suitable reaction vessel and heated, with stirring, to 195-200° C. and, while maintaining the anthracene solution within this temperature range, 35 parts of 98% nitric acid dissolved in 50 parts of nitrobenzene is added over a period of approximately one hour. The whole is then stirred and cooled or allowed to cool to about 20° C., at which temperature the anthraquinone crystallizes out and is recovered by filtration. The filter cake is washed with about 25 parts of nitrobenzene and subsequently the residual nitrobenzene in the filter cake is removed by steam distillation. The product is then washed with hot water and dried, yielding 25 parts of anthraquinone melting at 285-286° C. The anthraquinone is 99.2% pure.

When the foregoing procedure is repeated using an equivalent amount of 68% nitric acid, similar results are obtained.

Example III

Forty (40) parts of anthracene of 84.7% purity and 240 parts of nitrobenzene are introduced into a suitable reaction vessel and heated, with stirring, to 175-185° C. While maintaining the solution in this temperature range, 50 parts of 98% nitric acid dissolved in 60 parts of nitrobenzene is added over a period of approximately one hour. The whole is stirred and cooled or allowed to cool to 20° C. The anthraquinone crystallizes out and is recovered in the same manner as set forth in Example II. The yield is 31 parts of anthraquinone melting at 282-285° C. and the purity is 98.3%.

When the foregoing procedure is repeated using chloronitrobenzene similar results are obtained.

Example IV

One hundred (100) parts of anthracene of 92.3% and 250 parts of nitrobenzene are introduced into a suitable reaction vessel and heated, with stirring, to approximately 160° C. While maintaining the solution at this temperature, 100 parts of 98% nitric acid dissolved in 250 parts of nitrobenzene are added over a period of approximately one hour. The whole is stirred and cooled or allowed to cool to 20° C. The anthraquinone crystallizes out and is recovered in the same manner set forth in Example II. The yield is 84 parts of anthraquinone melting at 281-285° C. and the purity is 98.8%.

When the foregoing procedure is repeated using dichlorobenzene as the solvent, similar results are obtained. Furthermore while the examples show the nitric acid dissolved in solvent before addition to the reaction mass, it is also satisfactory to add the nitric acid to the reaction mass without first so diluting it with solvent.

Apparently at the temperature used in this process the nitric acid acts chiefly, if not entirely, as oxidizing agent so that the solvents selected should be those substantially resistant to oxidation under those conditions.

While the process of this invention is advantageously executed at atmospheric pressure, superatmospheric pressures can be used if desired, in which case means for release of excessive pressures are advantageously provided.

It is to be observed that anthraquinone prepared in accordance with the present invention can be produced from anthracene of varying purity and that it is not necessary, as in the case of other processes, to use pure anthracene or anthracene of any particular purity. It has further been found that, while nitric acid of 98% concentration produces excellent results and is therefore preferred, the invention is not limited to the use of this particular strength of nitric acid but concentrated nitric acid of any available strength, e. g., 68%, may be satisfactorily employed.

Since the purpose of the solvent is mainly to get the anthracene into a liquid or dissolved state, the amount of solvent is not critical and can range between the smallest amount of solvent required to get the anthracene dissolved and up to any dilution that is desired or is practical. While, as illustrated in Example I, the oxidation can be conducted in the absence of solvent, it is definitely preferred to use a solvent, advantageously nitrobenzene, to obtain a smoother, better controlled reaction and improved yields of product. Furthermore, while the examples show the nitric acid dissolved in solvent before addition to the reaction mass, it is also satisfactory to add the nitric acid to the reaction mass without first diluting it with solvent.

Moreover, nitrobenzene has been found to be the preferred solvent for the anthracene or nitric acid, or both, but the invention is not limited thereto since other solvents may be successfully utilized so long as they are inert with respect to oxidation by the nitric acid and so long as they have a sufficiently high boiling point, which should be at least about 150° C. but preferably 200° C. or higher. While higher temperatures can be used there is generally no advantage in going to temperatures above about 220° C. Other suitable organic solvents are the halogenated benzene derivatives such as di- and trichlorobenzene, chloronitrobenzene, etc.

While the foregoing examples show the recovery of anthraquinone by precipitation from nitrobenzene, other known methods of recovery may be used. Furthermore, in cases where the by-products and reactants in the reaction mass do not interfere, the anthraquinone may be subsequently reacted with other materials and eventually recovered, or used in the derivative form without purification of the anthraquinone itself.

It is particularly noteworthy that the present process has the unique advantage of not being adversely affected by the nature or extent of the impurities in the anthracene. This is in contrast to prior processes in which the impurities, in addition to cutting down the yield of anthraquinone, have the further effect of reducing the conversion of the actual anthracene content of the starting material. Furthermore, the present process is carried out under conditions which eliminate the formation of undesirable by-products. By following the present procedure, it is therefore possible to produce exceptionally pure anthraquinone in practically quantitative yield by the conversion of anthracene to anthraquinone through the use of concentrated nitric acid.

The foregoing is intended as illustrative and not as limitative as the invention is defined by the appended claims within the terms of which various changes may be made without departing therefrom.

What is claimed is:

1. A process for the preparation of anthraquinone which comprises adding concentrated nitric acid to anthracene which is in a liquid state and at a temperature of at least 150° C. whereby the anthracene is oxidized to anthraquinone.

2. A process for the preparation of anthraquinone which comprises adding concentrated nitric acid to anthracene which is dissolved in an inert organic solvent and which is at a temperature of at least 150° C. whereby the anthracene is oxidized to anthraquinone.

3. A process for the preparation of anthraquinone of high purity which comprises oxidizing anthracene at an elevated temperature of at least 150° C. while dissolved in an inert organic solvent with concentrated nitric acid that is also dissolved in an inert organic solvent.

4. A process for the preparation of anthraquinone of at least about 98% purity from crude anthracene which comprises adding concentrated nitric acid to said anthracene while the anthracene is in heated solution at above 150° C. in an inert organic solvent having a boiling point over about 150° C. whereby said anthracene is oxidized to anthraquinone.

5. The process of claim 4 in which the inert organic solvent is nitrobenzene.

6. The process of claim 4 in which the anthracene solution is heated to a temperature in the range of about 150–220° C. and the concentrated nitric acid is gradually added thereto.

7. The process of claim 6 in which, after the addition of the nitric acid, the temperature is reduced to 20° C., whereupon the anthraquinone crystallizes out.

8. A process for the preparation of anthraquinone of at least about 98% purity by the substantially quantitative conversion of anthracene thereto, which comprises adding 98% nitric acid to anthracene which has been dissolved in nitrobenzene and heated to above 150° C. and recovering the anthraquinone thus produced in crystalline form.

9. A process for the preparation of anthraquinone by the oxidation of anthracene which comprises gradually adding concentrated nitric acid to a solution of anthracene in an inert organic solvent heated to about 150–220° C. and recovering the anthraquinone thus produced.

10. A process for the preparation of anthraquinone of at least about 98% purity in practically quantitative yield from anthracene of any purity which comprises heating a solution of anthracene in nitrobenzene to a temperature of about 150–220° C., adding 98% nitric acid thereto over a period of about one hour while maintaining the anthracene solution in the stated temperature range, cooling to 20° C. and isolating the anthraquinone thus produced.

References Cited in the file of this patent

UNITED STATES PATENTS

| | | |
|---|---|---|
| 1,103,383 | Singer et al. | July 14, 1914 |
| 2,022,845 | De Rewal | Dec. 3, 1935 |
| 2,821,534 | Alexander | Jan. 28, 1958 |